US012761080B2

(12) United States Patent
Yao et al.

(10) Patent No.: US 12,761,080 B2
(45) Date of Patent: Oct. 13, 2026

(54) ADJUSTABLE SINGLE-CHANNEL TIME-DOMAIN SAMPLING FILTER, SPECTROMETER, AND DETECTION METHOD

(71) Applicant: GLITTERINTECH (XUZHOU) LIMITED, Xuzhou (CN)

(72) Inventors: Chunhui Yao, Xuzhou (CN); Ting Yan, Xuzhou (CN)

(73) Assignee: GLITTERINTECH (XUZHOU) LIMITED, Xuzhou (CN)

( * ) Notice: Subject to any disclaimer, the term of this patent is extended or adjusted under 35 U.S.C. 154(b) by 0 days.

(21) Appl. No.: 19/411,438

(22) Filed: Dec. 8, 2025

(65) Prior Publication Data

US 2026/0092812 A1 Apr. 2, 2026

Related U.S. Application Data

(63) Continuation of application No. PCT/CN2023/116853, filed on Sep. 4, 2023.

(30) Foreign Application Priority Data

Jun. 8, 2023 (CN) ......................... 202310678341.3

(51) Int. Cl.
*G01J 3/45* (2006.01)
*G01J 3/02* (2006.01)
(Continued)

(52) U.S. Cl.
CPC . *G01J 3/45* (2013.01); *G01J 3/02* (2013.01); *G01J 3/0227* (2013.01); *G02B 6/125* (2013.01);
(Continued)

(58) Field of Classification Search
CPC .......... G01J 3/45; G01J 3/0235; G01J 3/0256; G01J 2003/1226; G02B 6/2935;
(Continued)

(56) References Cited

U.S. PATENT DOCUMENTS 6,208,780 B1 * 3/2001 Li ........................... G02F 1/225 385/27
6,341,186 B1 * 1/2002 Singh ................. G02B 6/29355 385/27
(Continued)

FOREIGN PATENT DOCUMENTS

CN 111947780 A 11/2020
CN 114441037 A 5/2022
(Continued)

*Primary Examiner* — Michelle M Iacoletti
*Assistant Examiner* — Noah J. Haney
(74) *Attorney, Agent, or Firm* — Bayramoglu Law Offices LLC

(57) ABSTRACT

The provided is an adjustable single-channel time-domain sampling filter, a spectrometer, and a detection method. The filter includes N stages of cascaded asymmetric interference units, where each asymmetric interference unit includes: a first waveguide splitting element, arranged at the input end, for splitting input light into two output paths; two interference arms, which respectively receive the light output from the two paths of the first waveguide splitting element and have different arm lengths; and a second waveguide splitting element, for combining the output light of the two interference arms to generate optical interference. Among the N cascaded asymmetric interference units, at least three are provided with phase modulators on their interference arms. When in use, the adjustable single-channel time-domain sampling filter tunes the phase modulators located in different cascaded asymmetric interference units to form optical channels with different spectral responses in the time sequence.

8 Claims, 7 Drawing Sheets

(51) Int. Cl.

| | |
|---|---|
| ***G01J 3/12*** | (2006.01) |
| ***G01J 3/453*** | (2006.01) |
| ***G02B 6/125*** | (2006.01) |
| ***G02B 6/293*** | (2006.01) |
| ***G02F 1/05*** | (2006.01) |
| ***G02F 1/21*** | (2006.01) |
| ***G02F 1/225*** | (2006.01) |

(52) U.S. Cl.
CPC ....... *G02B 6/2935* (2013.01); *G02B 6/29355* (2013.01); *G01J 3/0218* (2013.01); *G01J 3/0235* (2013.01); *G01J 3/0256* (2013.01); *G01J 2003/1226* (2013.01); *G01J 3/4531* (2013.01); *G02B 6/29352* (2013.01); *G02B 6/29361* (2013.01); *G02B 6/29362* (2013.01); *G02B 6/29364* (2013.01); *G02F 1/0508* (2013.01); *G02F 1/21* (2013.01); *G02F 1/212* (2021.01); *G02F 1/225* (2013.01)

(58) Field of Classification Search
CPC ............ G02B 6/29355; G02B 6/29352; G02B 6/29361; G02B 6/29362; G02B 6/29364; G02F 1/0508; G02F 1/21; G02F 1/212; G02F 1/225
USPC ......................................... 356/326, 451, 477
See application file for complete search history.

(56) References Cited

U.S. PATENT DOCUMENTS

| | | | | |
|---|---|---|---|---|
| 9,874,698 | B2 * | 1/2018 | Fondeur | G02B 6/29355 |
| 12,429,363 | B2 * | 9/2025 | Fischer | G06N 3/126 |
| 2002/0021856 | A1 * | 2/2002 | Hatayama | G02F 1/225 385/15 |
| 2003/0053747 | A1 * | 3/2003 | Cormack | G02B 6/29383 385/47 |
| 2003/0179972 | A1 | 9/2003 | Gerlach et al. | |
| 2005/0053328 | A1 * | 3/2005 | Doerr | H04J 14/0227 385/27 |
| 2010/0046065 | A1 * | 2/2010 | Little | G02B 6/12007 359/578 |
| 2017/0227399 | A1 * | 8/2017 | Hu | G02F 1/3136 |
| 2020/0256728 | A1 * | 8/2020 | Kita | G02F 1/212 |
| 2021/0041760 | A1 | 2/2021 | Qiao | |

FOREIGN PATENT DOCUMENTS

| | | | | |
|---|---|---|---|---|
| CN | 114577337 | A | 6/2022 | |
| IT | 201800009476 | A1 * | 4/2020 | G02F 1/225 |
| JP | H08201865 | A | 8/1996 | |
| WO | WO-2024134473 | A1 * | 6/2024 | G01J 3/4412 |

* cited by examiner

ADJUSTABLE SINGLE-CHANNEL TIME-DOMAIN SAMPLING FILTER, SPECTROMETER, AND DETECTION METHOD

CROSS-REFERENCE TO THE RELATED APPLICATIONS

This application is a continuation application of International Application No. PCT/CN2023/116853, filed on Sep. 4, 2023, which is based upon and claims priority to Chinese Patent Application No. 202310678341.3, filed on Jun. 8, 2023, the entire contents of which are incorporated herein by reference.

TECHNICAL FIELD

The present specification relates to the technical field of computationally reconstructed spectrometers, and specifically to an adjustable single-channel time-domain sampling filter, a spectrometer, and a detection method.

BACKGROUND

As one of the most basic detection devices, spectrometers can effectively analyze the physical properties and chemical compositions of materials by utilizing their spectral information, and thus are widely used in numerous fields.

Traditional spectral detection spectrometers mainly include dispersive spectrometers based on prisms or narrowband filters and Fourier transform spectrometers based on Michelson interferometers. However, these spectrometers suffer from shortcomings such as high energy loss, large size, high cost, and high computational complexity, making it difficult to meet the current market demand for miniaturized and low-cost spectral detection devices.

In recent years, computational spectrometers, as a novel spectral detection device, have attracted extensive attention from academia and industry. The fundamental principle behind computational spectrometers involves inputting an unknown spectrum into multiple pre-calibrated sampling filters, followed by the sequential detection of the filtered light intensity signals using photodetectors. By leveraging these pre-calibrated filters and the detected intensity signals, an underdetermined system of equations can be formulated, enabling the reverse calculation of the input spectrum through relevant algorithms. In contrast to traditional dispersive spectrometers, which require individual sampling of each pixel, the primary advantage of computational spectrometers lies in their ability to solve a large number of pixels in the spectral frequency domain with fewer sampling times through an optimal combination of sampling filters, thereby significantly enhancing detection efficiency.

However, currently common computational spectrometers all construct multiple independent sampling channels in the spatial domain, namely, the power of the incident spectrum is evenly divided into multiple parts, and then sequentially input into the corresponding sampling channels for detection. This inevitably leads to very limited power allocated to each channel, thereby reducing the signal-to-noise ratio of the system. In addition, constructing multiple spatial sampling channels will occupy a larger volume and consume more resources, which hinders the miniaturization of devices. These shortcomings are particularly obvious for on-chip integrated devices. Therefore, there is a need to develop a sampling filter and spectrometer that are compact, easy to integrate, and offer high signal-to-noise ratios.

SUMMARY

The present specification aims to solve one of the technical problems in the related art to a some extent. Therefore, the present specification provides an adjustable single-channel time-domain sampling filter, a spectrometer, and a detection method, which have the advantages of small occupied volume, high level of integration, high signal-to-noise ratio, high detection accuracy, and fast detection speed.

To achieve the above object, the present specification adopts the following technical solution:

An adjustable single-channel time-domain sampling filter, which, when in use, is configured in an on-chip computationally reconstructed spectrometer, comprises N stages of cascaded asymmetric interference units, where N≥3; the asymmetric interference unit comprises:

A first waveguide splitting element, arranged at an input end, for splitting an input light into two paths for output according to a preset splitting ratio;

Two interference arms, respectively receiving light output by the two paths of the first waveguide splitting element; the two interference arms have different arm lengths; and, A second waveguide splitting element, for combining the output light of the two interference arms to induce optical interference;

Wherein, at least three asymmetric interference units are provided with phase modulators on their interference arms;

In two consecutive cascaded stages of asymmetric interference units, the output light of the second waveguide splitting element in the previous stage serves as the input light of the first waveguide splitting element in the subsequent stage;

When in use, the adjustable single-channel time-domain sampling filter generates optical channels with different spectral responses in the time sequence by tuning the phase modulators located in different cascaded asymmetric interference units.

In the above-mentioned solution, the adjustable single-channel time-domain sampling filter employs a single-channel structure, which not only reduces the spatial volume and enhances the integration density but also allows the full incident power to enter the single-channel filter without division. Excluding transmission losses, the output spectral power is significantly improved compared to conventional multi-channel solutions that equally distribute input power. Consequently, when using identical photodetector, the signal-to-noise ratio (SNR) increases, thereby enhancing the detection accuracy. Additionally, since on-chip waveguide phase modulation can achieve millisecond-to-microsecond response times, the system demonstrates extremely high detection speeds.

The present specification is further preferred in that, the phase modulator is arranged on one or both interference arms in the asymmetric interference unit.

The present specification is further preferred in that, the phase modulator provides at least three different phase adjustment states.

The spectral phase on the interference arm may be adjusted via the phase modulator to modify its spectral response. By controlling phase modulators located in multiple asymmetric interference units of different cascades, more combinations may be realized, and the randomness of the output spectrum can also be increased.

The present specification is further preferred in that, the splitting ratio of both the first waveguide splitting element and the second waveguide splitting element range from 0.05 to 0.3.

Each waveguide splitting element has two input ports and two output ports, with its splitting ratio defined as the power ratio between the two output ports. During spectrum transmission from the previous stage of asymmetric interference unit to the subsequent stage of asymmetric interference unit, optical attenuation occurs and accumulates progressively with increasing cascade stages. Through experiments and simulations, the splitting ratio in this solution is set to range from 0.05 to 0.3, which can not only ensure that both interference arms in each cascade receive optical power to generate a randomly disturbed spectrum at the output end of the filter, but also maintains the cumulative transmission loss within an acceptable range across multiple stages.

The present specification is further preferred in that, within two adjacent cascade stages of asymmetric interference units, the second waveguide splitting element in the previous stage of asymmetric interference unit shares the same waveguide splitting element with the first waveguide splitting element in the subsequent stage of asymmetric interference unit.

The present specification is further preferred in that, the splitting ratio of the shared waveguide splitting element in two adjacent cascade stages of asymmetric interference units ranges from 0.05 to 0.95.

For the shared waveguide splitting element, since its splitting element is shared by adjacent interferometers (i.e., asymmetric interference units), its system response may not be mathematically described by the product of the independent transmission spectra of multiple interferometers. Nevertheless, through numerical simulation, its system transmission response may still be easily obtained. Simulation results show that when its splitting ratio ρ is varied within a relatively broad range of 0.05 to 0.95, an ideal disturbance effect is consistently achieved.

The present specification is further preferred in that, in the same asymmetric interference unit, the arm length difference between the two interference arms is configured to range from 1 μm to 600 μm.

The disturbance effect of the output spectrum of the filter may be adjusted by adjusting the arm length difference, and a smaller resolution spectrum may be obtained with a larger arm length difference. When the arm length difference of one of the filters reaches 600 μm, the speed of light in the SiN waveguide is approximately $1.5\times10^{8}$ m/s, and 600 μm divided by the speed of light is 0.004 ns to complete the transmission, so the period on the spectrum is about its reciprocal 250 GHz. In the C-band, 100 GHz is approximately 0.8 nm, so the spectral period is approximately 2 nm. The spectrometer corresponding to this spectral period may achieve a resolution of approximately 20 μm to 100 μm. Considering practical requirements, this current resolution is suitable for detecting the content of all substances.

The present specification is further preferred in that, the asymmetric interference unit is a Mach-Zehnder interferometer structure.

The present specification is preferred in that, at least one of the asymmetric interference units is a passive Mach-Zehnder interferometer structure.

In addition, the present specification also provides a computationally reconstructed spectrometer, which comprises a light source, a photodetector, and the aforementioned adjustable single-channel time-domain sampling filter. The reasoning process of the beneficial effects of the computationally reconstructed spectrometer provided by the present specification is similar to that of the aforementioned adjustable single-channel time-domain sampling filter, and will not be repeated here.

Moreover, the present specification also provides a spectral detection method, which uses the above computationally reconstructed spectrometer to obtain a spectral response matrix and an underdetermined system of equations.

At the same time, the present specification also provides a computer device, comprising a memory and a processor, wherein the memory stores a computer program, and the processor implements the spectral detection method described in any one of the above when executing the computer program.

These features and advantages of the present specification will be disclosed in detail in the following specific embodiments and accompanying drawings. The best implementation modes or means of the present specification will be presented in detail in conjunction with the accompanying drawings, but they are not intended to limit the technical scheme of the present specification. In addition, these features, elements, and components appearing in each of the following texts and accompanying drawings are multiple, and are marked with different symbols or numbers for convenience of representation, but they all represent components with the same or similar structures or functions.

BRIEF DESCRIPTION OF THE DRAWINGS

The present disclosure will be further described below with reference to the accompanying drawings.

REFERENCE NUMERALS

Figure 1:
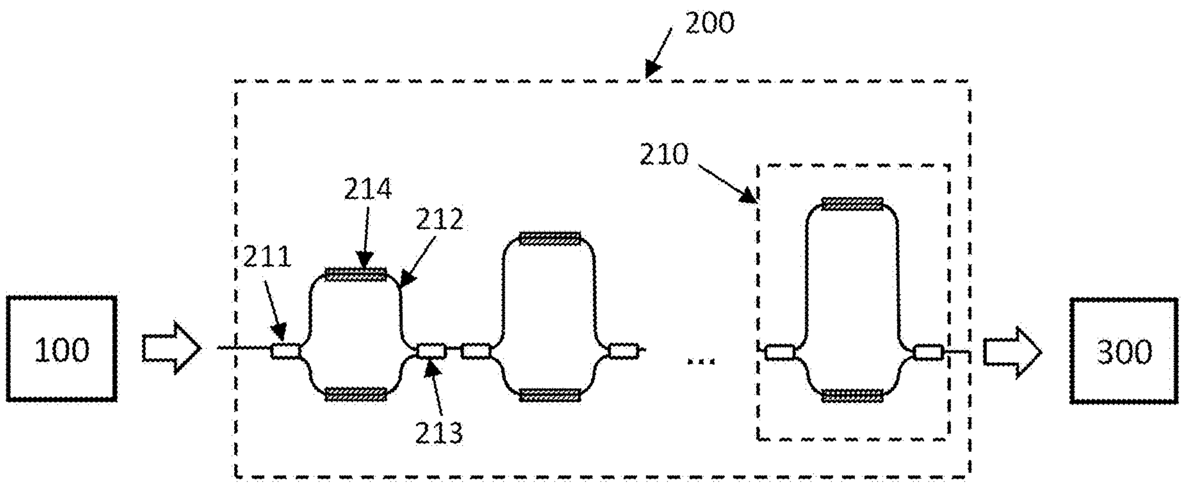
FIG. 1 is a structural block diagram of the spectrometer according to the present specification.

100. Light source; 200. Adjustable single-channel time-domain sampling filter; 210. Asymmetric interference unit; 211. First splitting element; 212. Interference arm; 213. Second splitting element; 214. Phase modulator; 300. Photodetector.

DETAILED DESCRIPTION OF THE EMBODIMENTS

The embodiments of the present disclosure are described below in detail. Examples of the embodiments are shown in the drawings. The same or similar numerals represent the same or similar elements or elements having the same or similar functions throughout the specification. The embodiments in implementations are only used to explain the present disclosure, and should not be construed as a limitation to the present disclosure.

The term “one embodiment” or “embodiment” or “example” referred to in the description means that a specific feature, structure or characteristic described in connection with the embodiment can be included in at least one embodiment of the present disclosure. The phrase “in an embodiment” in the description unnecessarily refers to the same embodiment.

The present specification provides an adjustable single-channel time-domain sampling filter, a spectrometer, and a detection method. The adjustable single-channel time-domain sampling filter and the spectrometer are based on an integrated optical platform, and three or more stages of asymmetric Mach-Zehnder interferometers (or referred to as asymmetric interference units) are constructed by using optical waveguides and optical waveguide devices, thereby forming an adjustable sampling filter.

The integrated optical platform here includes a silicon-based optical platform (e.g., pure silicon or silicon-germanium platform), a silicon nitride (SiN) optical platform, a III-V group optical platform such as indium phosphide (InP) or indium arsenide (InAs), a lithium niobate (LN) optical platform, and even various hybrid integrated platforms. Among them, the selection of different platforms has different advantages and disadvantages. For example, the silicon-based platform has the advantages of small device volume, high thermo-optical efficiency, and well-established manufacturing process, while the lithium niobate platform has the advantages of high electro-optical efficiency and suitability for high-speed modulation. Selection may be made according to actual needs without limitation.

Each interferometer comprises corresponding waveguide splitting elements and two interference arms of different lengths. The phase of each interferometer may be actively modulated by a phase modulator arranged on its interference arm, so as to realize the change of the overall spectral response of the sampling filter, and then realize the sampling of the unknown spectrum in the time sequence.

An asymmetric Mach-Zehnder interferometer (or referred to as an asymmetric interference unit) may be realized through different optical waveguide device designs. For example, its splitting element may be a multimode interferometer, a directional coupler, or a Y-splitter. At the same time, the connection forms between these splitting elements may be of various types. Specifically, the splitting elements between adjacent interferometers may be independent of each other or shared, which may be referred to as independent type and shared type for convenience of description.

In addition, a phase modulation of each Mach-Zehnder interferometer may also be realized in various ways. For example, the phase modulator may be based on the thermo-optic effect, electro-optic effect, or nonlinear effect of the waveguide to realize phase control. At the same time, considering the trade-off between modulation efficiency and device complexity, the phase modulator may be deployed on both arms of each interferometer or only on one of the single arms. In addition, in the sampling filter comprising multi-stage Mach-Zehnder interferometers, several cascade stages of passive Mach-Zehnder interferometers without phase modulation capability may also be incorporated.

Based on the above adjustable single-channel time-domain sampling filter (optical path) and combined with a photodetector, a chip-level computational spectrometer may be built, which has the advantages of small occupied volume, high integration, high signal-to-noise ratio, high detection accuracy, and fast detection speed.

The photodetector here may be integrated on the same chip as the designed adjustable single-channel time-domain sampling filter (optical path), such as an on-chip integrated germanium or III-V group compound photodetector, or may be mounted externally to the chip, such as a surface-mounted photodetector, or a photosensitive element including a charge-coupled device (CCD) and a complementary metal-oxide-semiconductor (CMOS).

Such an on-chip integrated adjustable single-channel time-domain spectrometer does not need to perform light splitting in the spatial domain, so the insertion loss of the device is extremely low, and it has a high signal-to-noise ratio. At the same time, since only one physical optical channel is needed, the device has a compact and relatively simple structure, and its volume and hardware resource consumption are much smaller than those of traditional spatial domain spectrometers. In addition, since the phase modulation of the on-chip waveguide may easily reach the millisecond or even microsecond level, such a spectrometer has an extremely high detection speed.

The following will describe in detail the two implementation modes of the independent type and the shared type of the splitting elements in the adjustable single-channel time-domain spectrometer in combination with specific embodiments.

Embodiment 1

FIG. 1 shows an on-chip computationally reconstructed spectrometer, which comprises a light source 100, an adjustable single-channel time-domain sampling filter 200, and a photodetector 300. The light source 100 provides an input spectrum for the adjustable single-channel time-domain sampling filter 200. When in use, the adjustable single-channel time-domain sampling filter 200 may form optical channels with different spectral responses in the time sequence, so as to obtain a spectral response matrix and an underdetermined system of equations in the process of calculating and reconstructing the spectrum. The photodetector 300 receives the spectrum output by the adjustable single-channel time-domain sampling filter and samples it to obtain corresponding light intensity information.

Specifically, the adjustable single-channel time-domain sampling filter 200 comprises N stages of cascaded asymmetric interference units 210, where $N \geq 3$ and N is an integer. The asymmetric interference unit 210 comprises a first waveguide splitting element 211, two interference arms 212, and a second waveguide splitting element 213.

In an asymmetric interference unit 210, the first waveguide splitting element 211 is arranged at the input end for splitting the input light into two paths for output. The two interference arms 212 respectively receive the light output by the two paths of the first waveguide splitting element 211. The second waveguide splitting element 213 is used for combining the output light of the two interference arms to generate optical interference.

It should be noted that the two interference arms here have different arm lengths or there is an arm length difference between the two interference arms to form an asymmetric structure.

Specifically, the first splitting element here may adopt a structure with two input ports and two output ports, or a structure with only one input port and two output ports. The specific selection is made according to the position of the first splitting element in the asymmetric interference unit. For example, the first splitting element located in the first stage of asymmetric interference unit may adopt a structure with only one input port, and the first splitting elements located in the asymmetric interference units after the first stage may all adopt a structure with two input ports.

The second splitting element may adopt a structure similar to or identical to that of the first splitting element, and the difference between the above two solutions lies in the fact that the input port and the output port are interchanged when in use. Similarly, the second splitting element located in the last stage of asymmetric interference unit may adopt a structure with only one output port.

In addition, except that the structures of the first splitting element and the second splitting element need to be adaptively adjusted according to their positions, in some embodiments, a structure with dual input ports and dual output ports may also be uniformly adopted. However, when in use, only one of the ports may be selected according to the position of the splitting element, and the other port is left unconnected. For the above-mentioned splitting element adopting a dual output port structure, its splitting ratio is the power ratio of its two output ports. The splitting ratio of the first waveguide splitting element 211 and the second waveguide splitting element 213 ranges from 0.05 and 0.3. The splitting ratio may be realized in various ways, such as a multimode interferometer, a directional coupler, or a Y-splitter, which may be selected by those skilled in the art according to specific conditions without limitation.

In the cascaded Mach-Zehnder interferometer structure proposed in the present embodiment, each interferometer (i.e., the asymmetric interference unit 210) may be equipped with a pair of independent splitting elements, namely the first waveguide splitting element 211 and the second waveguide splitting element 213.

Multiple stages of asymmetric interference units are connected in series in sequence. In two adjacent cascade stages of asymmetric interference units, the output light from the second waveguide splitting element in the previous stage serves as the input light of the first waveguide splitting element in the subsequent stage.

Figure 2:
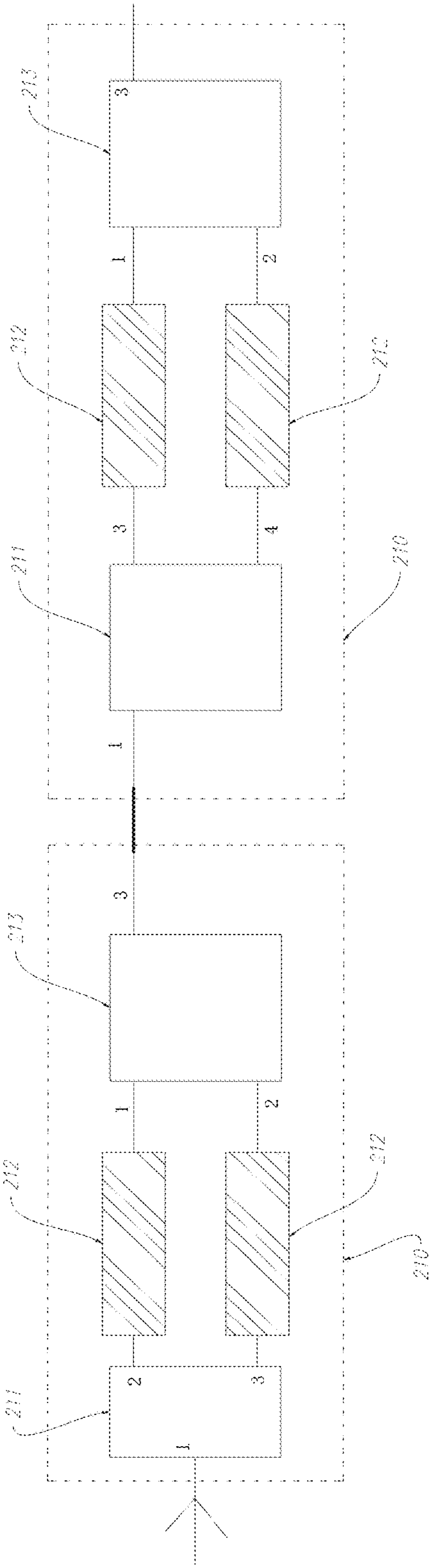
FIG. 2 is a schematic structural diagram of the adjustable single-channel time-domain sampling filter according to the present invention, showing the first two asymmetric interference units adopting independent splitting elements.

More specifically, as shown in FIG. 2, the first stage of asymmetric interference unit and the second stage of asymmetric interference unit are taken as examples for illustration. In the first stage of asymmetric interference unit, the light source is coupled to the input port of the first waveguide splitting element through a waveguide element. One end of each of the two interference arms is respectively connected to the two output ports of the first waveguide splitting element, and the other end of each of the two interference arms is respectively connected to the two input ports of the second waveguide splitting element. One input port of the first waveguide splitting element in the second stage of asymmetric interference unit is connected to one output port of the second waveguide splitting element in the first stage of asymmetric interference unit, and the other input port of the first waveguide splitting element in the second stage of asymmetric interference unit and the other output port of the second waveguide splitting element in the first stage of asymmetric interference unit are both left unconnected. Similarly, the connections of other cascaded asymmetric interference units will not be described one by one.

Due to the adoption of this connection approach, one output port of the second waveguide splitting element connected to the next stage in each stage of asymmetric interference unit is left unconnected. This leads to a certain degree of spectrum loss during transmission, that is, attenuation, which gradually accumulates as the quantity of stages increases. Through experiments and simulations, the splitting ratio in this embodiment is designed to range from 0.05 and 0.3, which may not only ensure that the two interference arms in each cascade may receive light and generate a randomly disturbed spectrum at the output end of the filter, but also control the loss of the spectrum during multi-stage transmission within an acceptable limit.

In addition to the aforementioned connection approach, in an alternative embodiment, the two input ports of the first waveguide splitting element in the second stage of asymmetric interference unit may also be respectively connected to the two output ports of the second waveguide splitting element in the first stage of asymmetric interference unit one by one, which is equivalent to sharing a single waveguide splitting element. For more details, refer to Embodiment 2 and FIG. 7.

In this embodiment, a phase modulator 214 is arranged on the interference arm 212 of the asymmetric interference unit 210. Here, the phase modulator may be realized in various ways, such as a phase modulator based on the thermo-optical effect of the waveguide, a phase modulator based on the electro-optical effect or nonlinear effect, and the like.

Figure 3A:
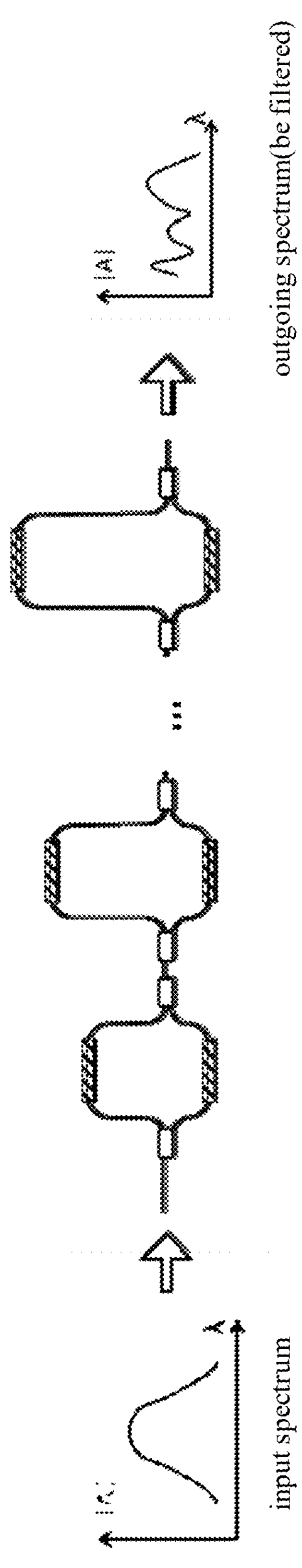
FIGS. 3A-3C are schematic diagrams of the phase modulator arranged on the interference arm in different ways in some embodiments.
Figure 3B:
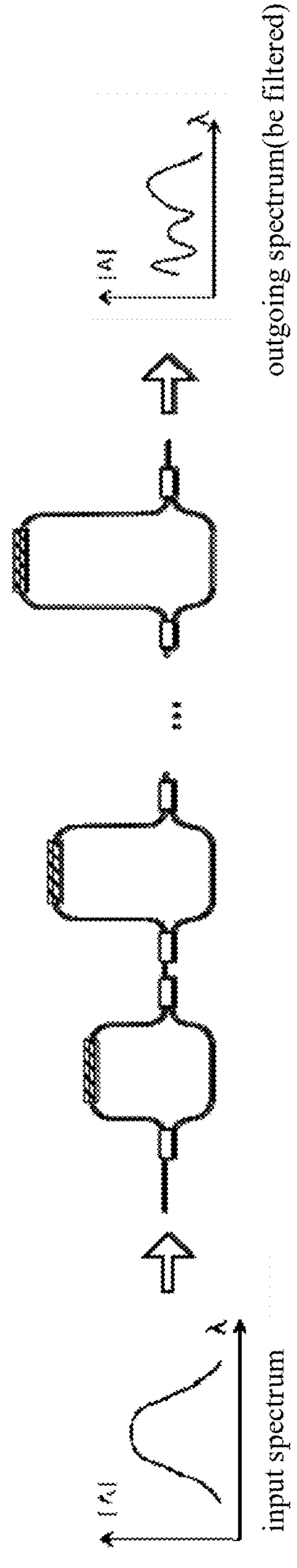
Figure 3C:
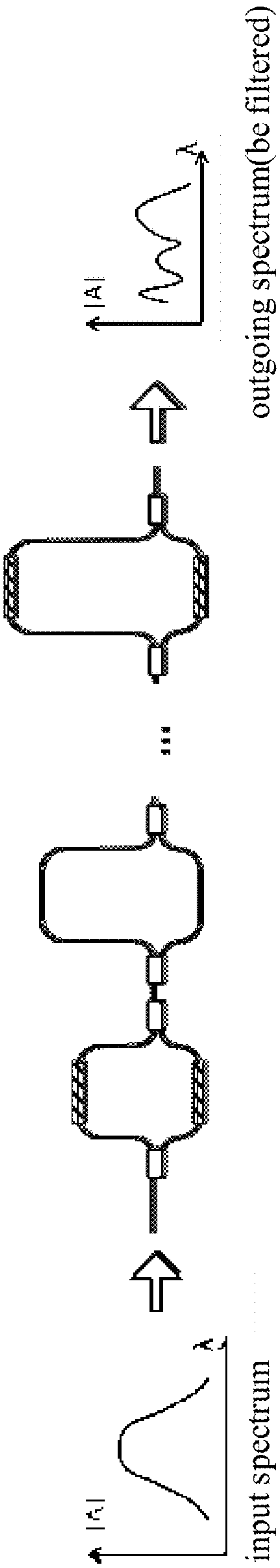

At the same time, considering the trade-off between device complexity and power consumption, there are multiple options for the quantity of phase modulators. Those skilled in the art may make a selection according to actual conditions. For example, in some exemplary embodiments, the phase modulators may be distributed on both arms of each interferometer as shown in FIG. 3A, or distributed on a single arm of each interferometer as shown in FIG. 3B, or distributed on several stages in a multi-stage structure as shown in FIG. 3C.

In order to achieve a better disturbance effect of the output spectrum (i.e., the outgoing spectrum) and have enough optical channels with different spectral responses formed in the time sequence when establishing the spectral response matrix and the underdetermined system of equations, in this embodiment, at least three asymmetric interference units are provided with phase modulators on the interference arms, and the phase modulators have at least three different phase adjustment states.

From the perspective of parameter design, there are differences between splitting elements adopting the independent type and those of the shared type. In a design adopting independent splitting elements, the spectral response of the interferometer follows a trigonometric function-like periodic oscillation relationship, as shown in the following formula:

$$T_i = \rho^2 + (1-\rho)^2 - 2\rho(1-\rho)\cos(\beta\Delta L_i + \delta_i)$$

Wherein, Ti refers to the transmission spectrum of the i-th interferometer, ρ is the splitting ratio of the splitting structure (which may be a multimode interference coupler or a directional coupler, etc.) in the interferometer, ΔLi is the arm length difference between the two interference arms, and δi is the phase of the interferometer, which can be adjusted by the phase modulator. For the overall filtering effect of the system to be more ideal, the splitting ratio ρ of each interferometer may be set within the range of 0.05 to 0.3, and the arm length difference ΔLi of each interferometer may range from 1 micrometer to 600 micrometers.

In the time domain, by modulating the phase di in different interferometers, the corresponding spectral response may be shifted, so that the spectrum after the cascade of the entire system is different from each other in the time domain. Since the phase of each interferometer may be modulated into multiple states and the system includes multi-stage interferometers, such a single-channel integrated optical path may easily construct an exponential number of time-domain sampling filter channels, and the number satisfies the following formula:

$$N_{total\ number\ of\ channels} = P_{phase\ state}{}^{\wedge}N_{number\ of\ states}$$

That is, the total number of time-domain channels is equal to a power series with the number of stages of phase-adjustable interferometers as the exponent and the number of phases modulated by the user in each stage of interferometer as the base. For example, when the adjustable filter has 6 stages of interferometers and the user modulates 4 phases for each interferometer, such as setting them to 0, π/2, π, and 3π/2 respectively, then 4^6 combinations can be constructed, that is, 4096 time-domain sampling channels.

Figure 4:
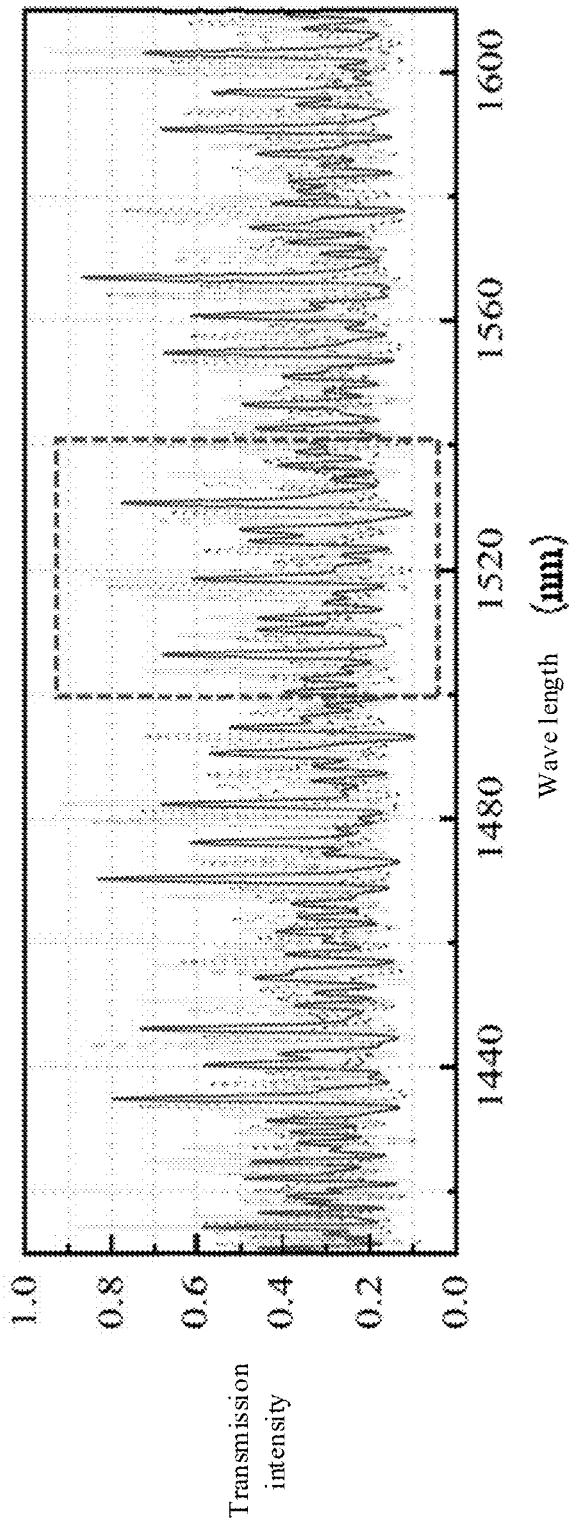
FIG. 4 is an example diagram of the spectral response of the time-domain sampling channel modulated by the adjustable single-channel time-domain sampling filter.

As shown in FIG. 4, several examples of the spectral response of the time-domain sampling channel modulated by the aforementioned adjustable single-channel time-domain sampling filter are presented. Among them, FIG. 5 is a partially enlarged view of the spectral response in the dashed box in FIG. 4.

Figure 5:
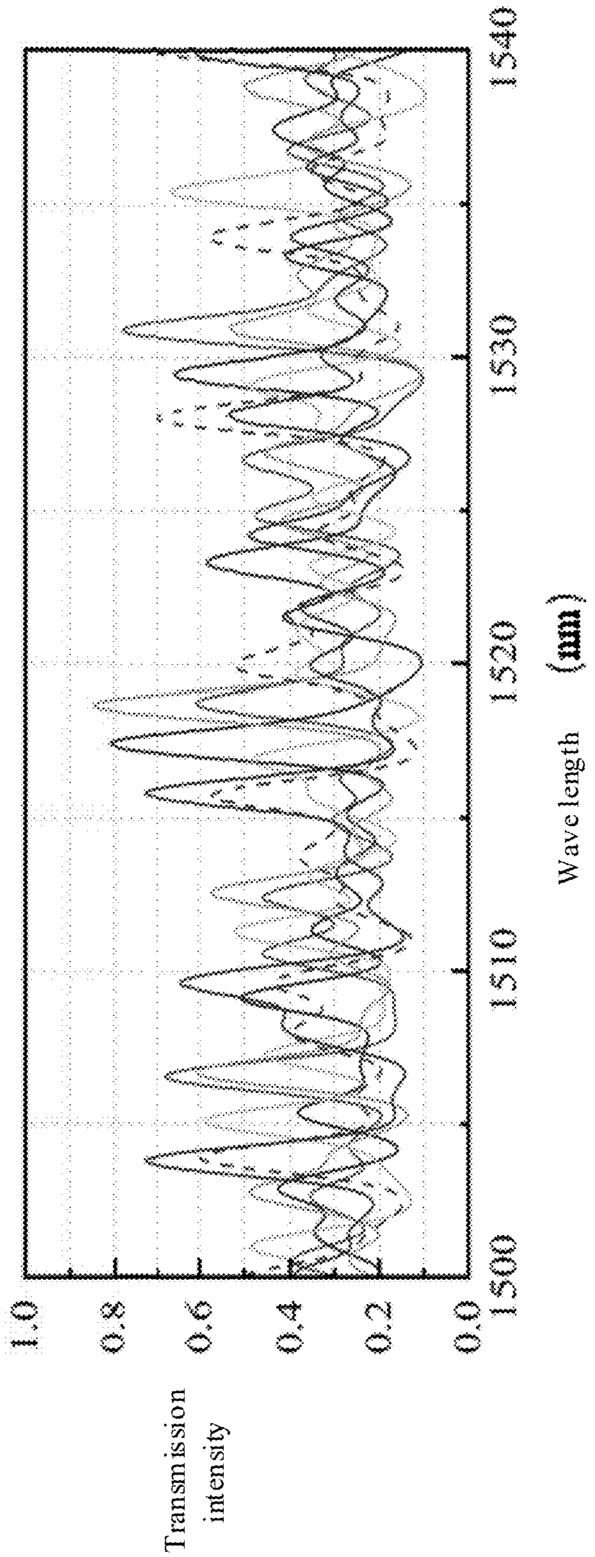
FIG. 5 is an enlarged view of the spectral response in the dashed box in FIG. 4.

Specifically, the spectral responses depicted in FIGS. 4 and 5 take a system with six stages of Mach-Zehnder interferometers as an example, which is of the independent type. The splitting ratio ρ of each interferometer is 0.1, and the bandwidth range spanning from 1410 nm to 1610 nm, covering a total range of 200 nm. The arm length difference between the two arms of the interferometer is set within the range of 100 to 600 micrometers, and each interferometer is set to have three different phase states, namely 0, π/3, and 2π/3. It can be seen that with different phase settings, the spectral response of the filter shows completely different spectral shapes, thus different sampling effects can be obtained.

This embodiment further provides a spectral detection method for the aforementioned on-chip computationally reconstructed spectrometer, which is used to obtain the detection data required for the spectral response matrix and the underdetermined system of equations through the on-chip computationally reconstructed spectrometer in the process of calculating and reconstructing the spectrum.

When in actual use, the adjustable single-channel time-domain sampling filter is firstly calibrated in advance to obtain the transmission matrix (i.e., the spectral response matrix) in the time domain. Subsequently, an unknown spectrum is input, and the pre-calibrated sampling channels are sequentially modulated in the time domain to obtain the corresponding light intensity information of the photodetector. By using the pre-calibrated transmission matrix and the detected light intensity information vector, the information of the incident spectrum in the frequency domain may be inversely solved, so as to achieve the goal of spectral detection. Mathematically, this process may be described as follows: assuming that N time-domain filter sampling channels are constructed, and the spectral response function of each channel is Hi(λ) (i=1, 2, . . . , N), where λ represents the wavelength of light, and assuming that the input spectrum is s(λ), then after passing through a certain filter channel, the corresponding light intensity value Yi measured by the photodetector can be expressed as:

$$Y_i = \int S(\lambda) * H_i(\lambda) d\lambda$$

Here, i=1, 2, . . . , N. Consequently, for the N time-domain filter channels, the measured light intensities Yi may be combined to form a vector Y with a size of N×1. By assembling all the time-domain filter channel response functions Hi(λ) into a matrix H with a size of N×M, and discretizing the input spectrum s(λ) into a vector S with a size of M×1, where M is the number of spectral pixels, the above equation can be transformed into a linear system of equations:

$$S_{M\times 1} = H_{M\times N} Y_{N\times 1}$$

By using mathematical algorithms such as convex optimization algorithms and machine learning techniques to solve this linear system of equations, the information of the input spectrum s(λ) may be obtained, so as to achieve the goal of spectral detection.

Figure 6:
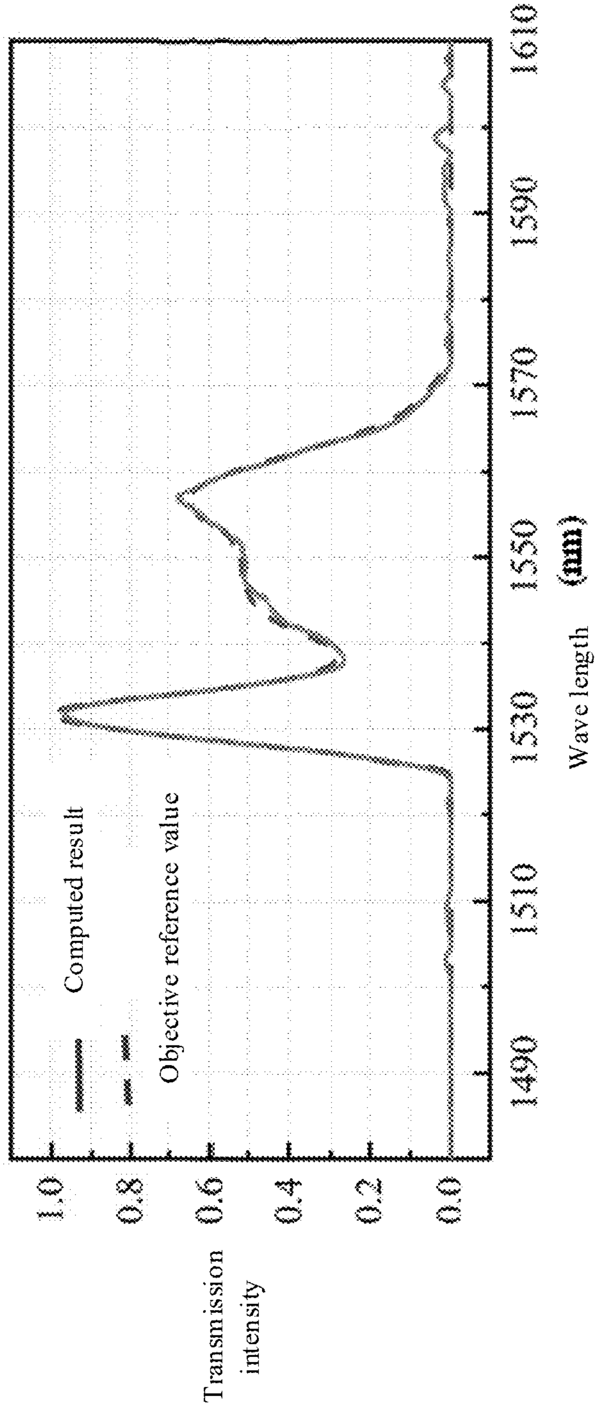
FIG. 6 is an experimental effect diagram of calculating and reconstructing a spectrum by using the computationally reconstructed spectrometer and the spectral detection method according to the present specification.

As shown in FIG. 6, an experimental result of calculating and reconstructing a spectrum by using the above on-chip computationally reconstructed spectrometer and the spectral detection method is presented. Here, a system with six cascade stages of independent Mach-Zehnder interferometers is taken as an example. It can be seen that the recovered spectrum is highly consistent with the actual input spectrum, indicating the high accuracy of its spectral detection.

Specifically, in this experiment, the experimenter constructed a six-stage adjustable Mach-Zehnder interferometer on a silicon nitride (SiN) integrated platform. For each interferometer, three different phase states were set, namely 0, π/3, and 2π/3. Consequently, a total of 3^6, that is, 729 time-domain sampling filter channels were constructed.

The experimental results show that the bandwidth of the time-domain computational spectrometer reaches 200 nm, and the accuracy reaches 0.01 nm, that is, more than 20,000 spectral pixels are obtained within the measured wavelength range of 1410 nm-1610 nm. The overall detection time is less than 0.8 seconds.

At the same time, this embodiment also provides a computer device, comprising a memory and a processor, wherein the memory stores a computer program, and when the computer program is executed by the processor, the processor is caused to execute the steps of the above spectral detection method. The steps of the spectral detection method here can be the steps in the memory analysis method of each of the above embodiments.

Those of ordinary skill in the art can understand that all or part of the processes in the methods of the above embodiments can be completed by instructing relevant hardware through a computer program. Accordingly, the computer program can be stored in a non-volatile computer-readable storage medium, and when executed, the computer program can implement the method of any one of the above embodiments

Embodiment 2

This embodiment shows an adjustable single-channel time-domain sampling filter with another structure. The main difference from the adjustable single-channel time-domain sampling filter in Embodiment 1 lies in that, in this embodiment, in two adjacent cascade stages of asymmetric interference units, the second waveguide splitting element in the previous stage of asymmetric interference unit shares the same waveguide splitting element with the first waveguide splitting element in the subsequent stage of asymmetric interference unit.

Figure 7:
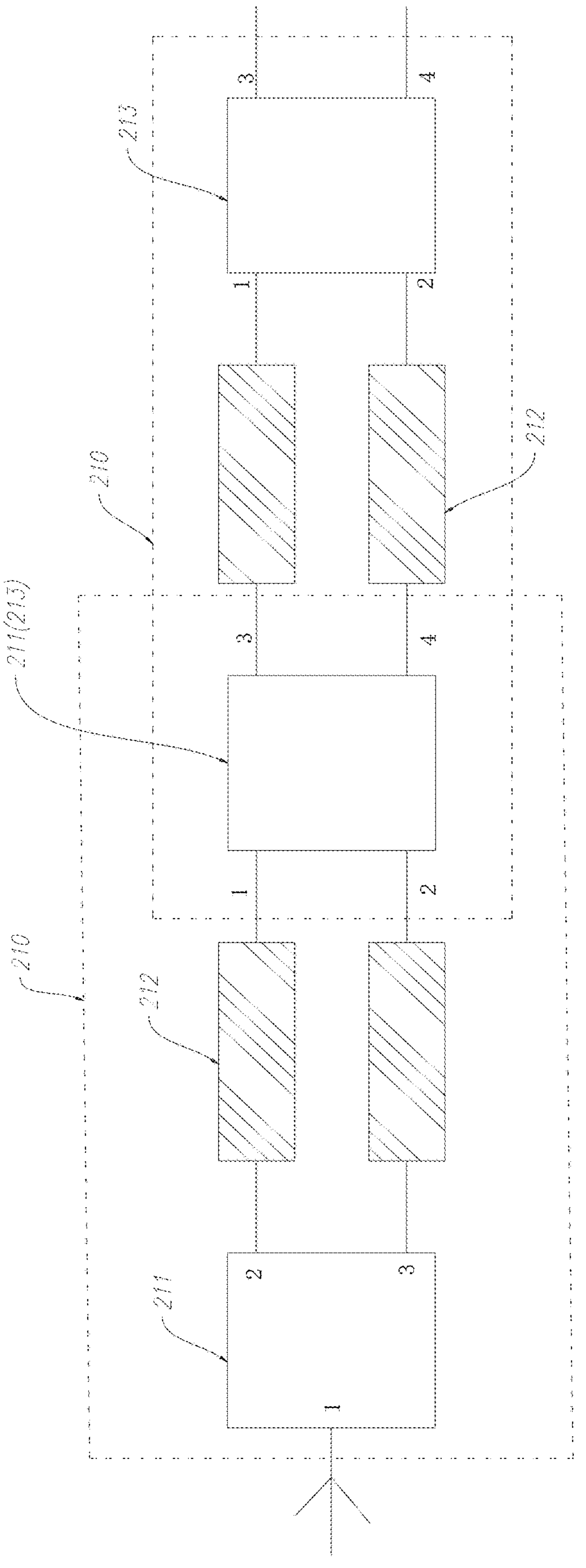
FIG. 7 is a schematic structural diagram of the first two asymmetric interference units in the adjustable single-channel time-domain sampling filter according to the present specification adopting shared splitting elements.

Specifically, the first stage of asymmetric interference unit and the second stage of asymmetric interference unit are taken as examples for illustration. As shown in FIG. 7, the first stage of asymmetric interference unit and the second stage of asymmetric interference unit share the same waveguide splitting element. The shared waveguide splitting element has 2 input ports and 2 output ports. The two input ports are respectively connected to the interference arms in the first stage of asymmetric interference unit, and the two output ports are respectively connected to the interference arms in the second stage of asymmetric interference unit. At this time, the shared waveguide splitting element may be regarded as both the second waveguide splitting element of the first stage of asymmetric interference unit and the first waveguide splitting element of the second stage of asymmetric interference unit.

Since there is less loss in this waveguide transmission structure, the splitting ratio of the shared waveguide splitting element in two adjacent cascade stages of asymmetric interference units may be set within the range of 0.05 and 0.95 according to needs.

The other features and structures are similar to or the same as those in Embodiment 1, and will not be described in detail one by one here.

The above described are only specific implementations of the present disclosure, which do not constitute a limitation on the protection scope of the present disclosure. Those skilled in the art should understand that the present disclosure includes but is not limited to the content described in the above accompanying drawings and the above specific implementations. Any modification without departing from the functional and structural principles of the present disclosure falls within the scope of the claims.

What is claimed is:

1. An adjustable single-channel time-domain sampling filter, which, when in use, is configured in an on-chip computationally reconstructed spectrometer, comprises N stages of cascaded asymmetric interference units, where N≥3; wherein, each of the asymmetric interference units comprises:

a first waveguide splitting element, arranged at an input end, for splitting an input light into two paths for output according to a preset splitting ratio;

two interference arms, respectively receiving light output by the two paths of the first waveguide splitting element; the two interference arms have different arm lengths; and, a second waveguide splitting element, for combining output light of the two interference arms to induce optical interference;

wherein at least three asymmetric interference units are provided with phase modulators on one or both of their interference arms;

wherein, in two consecutive cascaded stages of asymmetric interference units, the output light of the second waveguide splitting element in a previous stage serves as the input light of the first waveguide splitting element in a subsequent stage;

wherein, when in use, the adjustable single-channel time-domain sampling filter generates optical channels with different spectral responses in a time sequence by tuning the phase modulators located in different cascaded asymmetric interference units;

wherein, within two adjacent cascade stages of asymmetric interference units, the second waveguide splitting element in the previous stage of asymmetric interference unit shares the same waveguide splitting element with the first waveguide splitting element in the subsequent stage of asymmetric interference unit.

2. The adjustable single-channel time-domain sampling filter according to claim 1, wherein the phase modulators provide at least three different phase adjustment states.

3. The adjustable single-channel time-domain sampling filter according to claim 1, wherein the preset splitting ratio of the first waveguide splitting element and a preset splitting ratio of the second waveguide splitting element both range from 0.05 to 0.3.

4. The adjustable single-channel time-domain sampling filter according to claim 1, wherein a splitting ratio of a shared waveguide splitting element in two adjacent cascade stages of asymmetric interference units ranges from 0.05 to 0.95.

5. The adjustable single-channel time-domain sampling filter according to claim 1, wherein in each of the asymmetric interference units, an arm length difference between the two interference arms is configured to range from 1 μm to 600 μm.

6. The adjustable single-channel time-domain sampling filter according to claim 1, wherein each of the asymmetric interference units is a Mach-Zehnder interferometer structure.

7. The adjustable single-channel time-domain sampling filter according to claim 1, wherein at least one of the asymmetric interference units is a passive Mach-Zehnder interferometer structure.

8. A computationally reconstructed spectrometer, comprising a light source, a photodetector, and the adjustable single-channel time-domain sampling filter according to claim 1.

* * * * *